United States Patent [19]

Davis et al.

[11] 4,324,138
[45] Apr. 13, 1982

[54] METHOD OF AND APPARATUS AND SYSTEM FOR DETERMINING TEMPERATURE CONDITIONS

[75] Inventors: Bayard C. Davis, Lombard; Donald H. Heyden, Inverness, both of Ill.

[73] Assignee: Alarma Systems Incorporated, Elgin, Ill.

[21] Appl. No.: 887,089

[22] Filed: Mar. 16, 1978

[51] Int. Cl.³ ............................................. G01K 7/02
[52] U.S. Cl. ...................................................... 73/341
[58] Field of Search .............. 73/341, 340, 342, 343.5; 364/557

[56] References Cited

U.S. PATENT DOCUMENTS

| | | | |
|---|---|---|---|
| 3,459,925 | 8/1969 | Goosey et al. | 73/341 |
| 3,475,750 | 10/1969 | Howell et al. | 340/13 |
| 3,493,949 | 2/1970 | Servos et al. | 73/341 |
| 3,540,280 | 11/1970 | Schoenlaub | 73/341 |
| 3,678,486 | 7/1972 | Bickel et al. | 73/341 |
| 3,798,971 | 3/1974 | Lowrance | 73/342 |
| 3,810,138 | 5/1974 | Thompson et al. | 340/225 |
| 3,938,385 | 7/1976 | Horwath | 73/342 |
| 4,055,166 | 10/1977 | Simpson et al. | 73/342 |
| 4,098,122 | 7/1978 | Landman et al. | 73/341 |
| 4,114,442 | 9/1978 | Pratt | 73/341 |
| 4,122,719 | 10/1978 | Carlson et al. | 364/557 |
| 4,162,175 | 7/1979 | Salt et al. | 73/341 |

Primary Examiner—Donald O. Woodiel
Attorney, Agent, or Firm—Hosier, Niro & Daleiden

[57] ABSTRACT

A method of and apparatus and system for determining temperature conditions within an environment is disclosed. The method includes utilization of one or more transducers disposed within the environment. One or more of the transducers are selectively scanned to either intermittently or continuously monitor signals generated at any location along the transducers. Additionally, the method includes selectively identifying one or more of the scanned transducers which generate signals of interest and converting such signals into a sense perception signal indicative of a temperature of interest. The apparatus and system includes utilization of one or more transducers disposed within the environment. It also includes scanning means operatively associated with at least one transducer for sensing signals generated at any location along the transducers and which is capable of identifying one or more scanned transducers which generate signals of interest. Additionally, the apparatus includes converting means for translating such signals into a sense perception signal indicative of a temperature of interest. With the method, apparatus and system of the present invention, an environment may continuously be monitored in order to determine both the magnitude and location of temperatures of interest.

42 Claims, 6 Drawing Figures

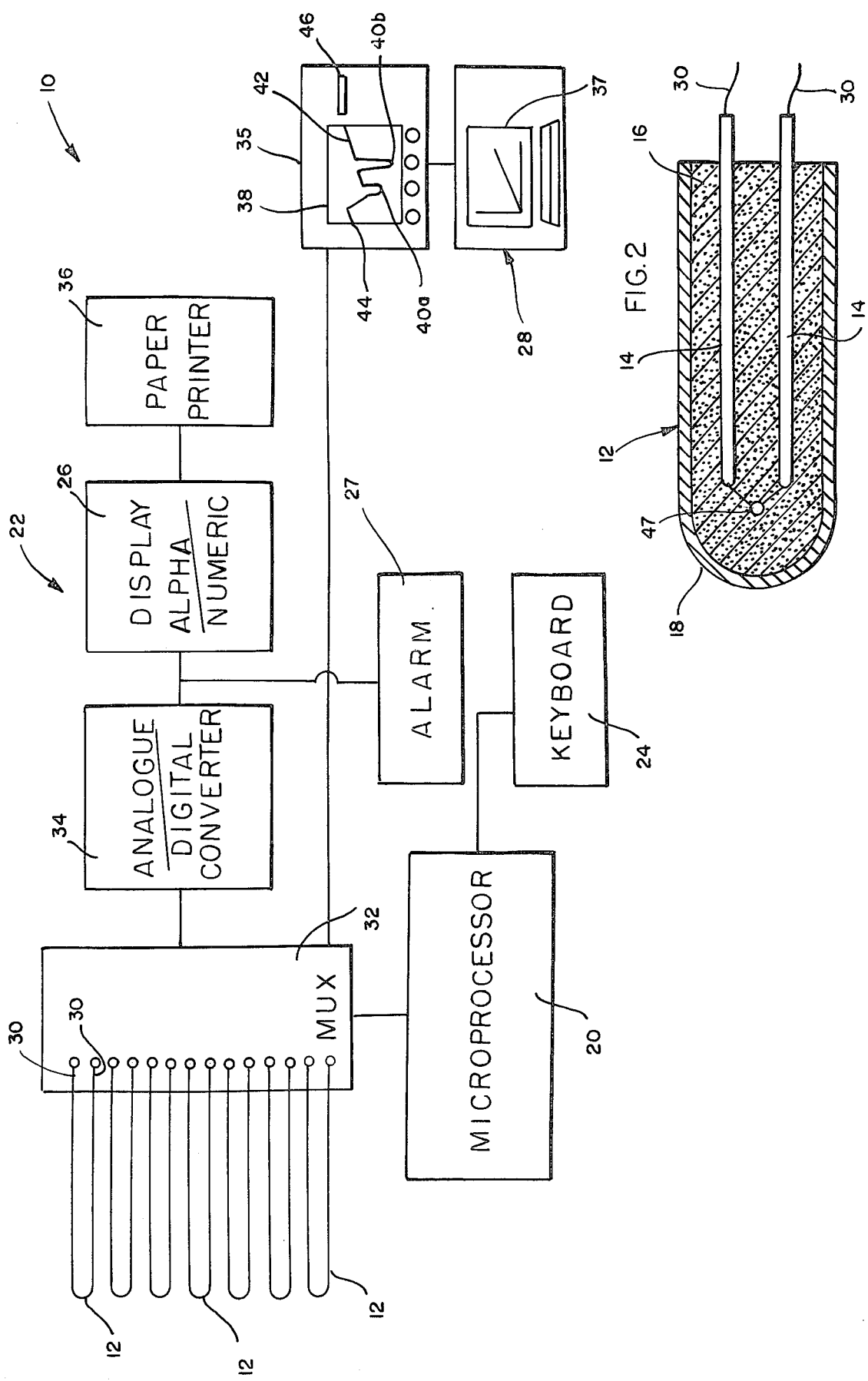

METHOD OF AND APPARATUS AND SYSTEM FOR DETERMINING TEMPERATURE CONDITIONS

BACKGROUND OF THE INVENTION

The present invention relates to methods of as well as apparatus and systems for determining temperature conditions of interest within an environment and, more particularly, to methods, apparatus, and systems for determining the magnitude and location of temperature conditions of interest within an environment through the use of effective and reliable electronic means in combination with a suitable array of one or more transducers.

In certain environments, as for example, nuclear reactors, steam or hot water pipes, electrical cable trays, aircraft or marine engines, granaries, manufacturing processes, refrigeration systems, etc., it is often essential to establish and maintain the continuous monitoring of temperature conditions of interest throughout the environment. This may be accomplished in many ways. One of the more common expedients has been to position a plurality of temperature sensors at various selected points within the environment and monitor each of the sensors individually. A more satisfactory system, however, involves the use of what may be called continuous transducers suitably positioned and arranged throughout the environment to be monitored. Such transducers may, in one form or configuration, each comprise at least a pair of thermocouple conductors surrounded by a mass of semiconductive material enclosed in a protective sheath. In this form of construction, the semiconductive material is usually of a composition which exhibits a negative or inverse temperature-resistance characteristic. The thermocouple conductors in such a transducer are formed of dissimilar thermoelectric materials capable of establishing temperature representative thermoelectric voltages when a junction is established therebetween in accordance with the well-known Seebeck effect. When a transducer embodying the aforedescribed construction is exposed to an environment wherein the temperature deviates from ambient, one or more thermoelectric junctions are established between the thermocouple conductors along the length of the transducer at those locations whereat the temperature deviation exists.

Suitable detection means associated with such a transducer can then be utilized to sense a voltage representative of the maximum temperature deviation from ambient existing along the length of the transducer. Suitable constructions of such transducer configurations are disclosed (as well as various alternate forms of suitable transducer constructions), for example, in U.S. Pat. No. 2,805,272, issued Sept. 3, 1975; U.S. Pat. No. 2,764,656, issued Sept. 25, 1956; U.S. Pat. No. 3,205,296, issued Sept. 7, 1965; and U.S. Pat. No. 3,408,607, issued Oct. 29, 1968. Among the techniques that may be advantageously employed to yield such constructions are those disclosed in U.S. Pat. No. 3,533,260, issued Nov. 21, 1967 and U.S. Pat. No. 3,737,997, issued June 12, 1973.

While systems utilizing such transducers can yield an indication of the magnitude of a maximum temperature condition existing along a transducer within a monitored environment, it is also important to have the capability of determining the precise location of such a maximum temperature condition within an environment by automatically initiating a determination of the location of that maximum temperature condition when its value exceeds a preselected minimum value. One system of the latter type is disclosed in U.S. Pat. No. 3,493,949, issued Feb. 3, 1970. In that system (as described more fully in the referenced patent), an energy source is adapted to apply energy to a transducer to establish a voltage drop along that portion of one of the transducer conductors which lies between (a) the point of application of the energy and (b) the junction where the maximum temperature condition prevails. The electronic means employed in such a system includes the capability of measuring the established voltage drop and, preferably, of converting that voltage drop to a direct indication of the location of the maximum temperature condition.

It has also been determined that a system employing a form of bridge network can be utilized for determining both the magnitude and location of temperature conditions. Such a system is disclosed in U.S. Pat. No. 3,683,606, issued Aug. 15, 1972. The measuring and locating functions are accomplished in one preferred form of such a detection system by providing a balanced dual energy source for applying energy to the transducer. The energy source applies energy to selected areas of the thermocouple conductors comprising the transducer and resultant voltage signals are translated into data representative of both the magnitude and location of the temperature condition.

While the foregoing briefly traces several of the earlier advances in the art, there has still not been available methods, apparatus and systems which are readily and effectively capable of continuously (and selectively) monitoring a large number of transducers (e.g., on the order of 300 to 1,000 or more) within an expansive and/or complex environment. Among the advantages to be realized with such a more versatile system configuration is the isolation of those transducers (or portions thereof) which are exposed to preselected temperature conditions of interest. As a concomitant of such isolation of those preselected temperature conditions, means can be provided for generating sense perception signals indicative of maximum temperature conditions and/or indicative of various different temperature levels, including a constantly monitored temperature profile of the environment of interest.

SUMMARY OF THE INVENTION

Accordingly, the present invention is directed to improved and novel methods, apparatus, and systems for determining temperature conditions of interest within an environment. In accordance with one preferred embodiment of the invention, one or more transducers are suitably arranged and/or distributed throughout an environment to be monitored. Scanning of the transducers is effected so that preselected temperature-representative signals which are generated in direct response to environmental conditions are susceptible to monitoring and/or recording in any of several ways.

Among the flexible monitoring and/or recording capabilities of the present invention is the selection option of effectively identifying one or more of the scanned transducers so that, for example, sense perception signals will be generated (and thus available for recordation) only when conditions within the environment being monitored deviate from pre-established norms or other established criteria. As used throughout this specification and in the appended claims, the phrase "sense perception signal" refers to any selected visual, audible and/or recordable representation which, typically, will correspond to temperatures of interest which deviate from criteria representing pre-established or preset norms.

The present invention also contemplates the selection, on a versatile basis, of any of a number of scanning programs or a sequence of scanning operations of a predeterminable or preset frequency and duration. Thus, the invention contemplates a wide range of monitoring functions which are all essentially adaptable to the generation of signal information (sense perception signals) when conditions within the environment deviate from or develop inconsistently with criteria representing pre-established or preset norms.

Such sense perception signals are preferably provided by either visual means or audio means or both to indicate the magnitude of the deviation of inconsistency and which may then be displayed, recorded and/or otherwise utilized for dictating any of a variety of signalling or control functions. As a further and additional advantageous feature of the present invention, provision is made for developing a profile of temperature conditions which prevail along the entire length of one or more transducers. This temperature profile capability is particularly well suited to manufacturing or production processes and similar applications.

The apparatus and system of the present invention preferably includes one or more transducers of suitable length and configuration and which may be readily disposed and/or arranged within an environment to be monitored. The transducers may preferably be of a two wire thermocouple configuration as disclosed, for example, in U.S. Pat. No. 3,683,696, issued Aug. 15, 1972. However, irrespective of the precise structural configuration which may be employed to yield transducer elements for use in implementing the present invention, it is important that such transducers be capable of yielding or permitting temperature related signals which are indicative of the environmental conditions being monitored. Thus, for example, the transducers might comprise a simplistic "J", "K", or "T" thermocouple wherein two dissimilar conductors are employed to generate a thermal EMF or may comprise a single current carrying conductor enclosed within a sheath to provide a path for signal return upon exposure to a temperature of interest.

Scanning means is operatively associated with one or more of the transducers for selectively receiving signals that are produced by the transducer configuration during the duration of the monitoring function performed by the system of the present invention. The scanning means is capable of selectively identifying a scanned transducer and converting means are employed for translating the signals of the scanned transducers into sense perception signals indicative of the environmental conditions being monitored. Further, in accordance with the invention, a control means is coupled to the scanning means for controlling the scanning function, thus permitting selection of both the frequency and duration of such transducer scanning.

The sense perception signals produced during the monitoring and scanning periods are preferably represented in visual form (for example, by numeric and/or alphabetic display elements or the like) by means associated with the converting means. The sense perception signals may also be provided by audio means or any of a variety of annunciator devices associated with the converting means.

Referring more specifically to various of the components of the system and apparatus of the present invention, a multiplexer, microprocessor and control means (e.g., in the form of a keyboard linked to the microprocessor) are cooperatively associated and employed to effect and control the scanning function heretofore described.

The signal monitoring, converting and display and/or recording functions are preferably effected by an analogue/digital converter operatively associated with the multiplexer and an alpha/numeric display element coupled to the analogue digital converter. The system and apparatus may also employ recording means in the form of a paper printed linked to the alpha/numeric display element for selectively maintaining a permanent record of the conditions prevailing (i.e., either continuously or transiently) within the monitored environment. In addition to the above, a time domain reflectometer is preferably operatively associated with the multiplexer so as to provide means for identifying and determining the location of a particular condition (e.g., a temperature deviation of interest) within the environment being monitored.

The present invention is therefore directed to novel methods of and apparatus and systems for determining temperature conditions of interest within an environment. Provision is made for the monitoring of any or all of a selected number of transducers disposed within the environment, and such monitoring may be effected at selected intervals and for durations compatible with criteria applicable to the particular environment being so monitored. The monitoring and scanning functions may be controlled and preselected temperature limits may be established so that transducers generating signal conditions of particular interest may be selectively identified. Thus, within appropriate limits, an environment may be monitored so as to yield indications of temperatures of interest as well as the particular location of such conditions. It is further possible to effectively obtain a graphic display of the identified transducer in the form of a temperature profile by using a graphic terminal and the temperature conditions within the environment may be permanently recorded.

The foregoing and other features of the present invention will be more fully appreciated from a consideration of the details of construction and operation set forth in the accompanying specification, claims and drawings.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings. In the drawings, like reference numerals identify like elements in the several figures, in which:

FIG. 1 is a block diagram illustrating one preferred form of a system and apparatus for determining temperature conditions within an environment in accordance with the present invention;

FIG. 2 is a longitudinal sectional view of a portion of one suitable transducer construction which may be employed in conjunction with and forming a part of the system and apparatus of FIG. 1;

DETAILED DESCRIPTION OF THE PREFERRED EMBODIMENT

Figure 3:
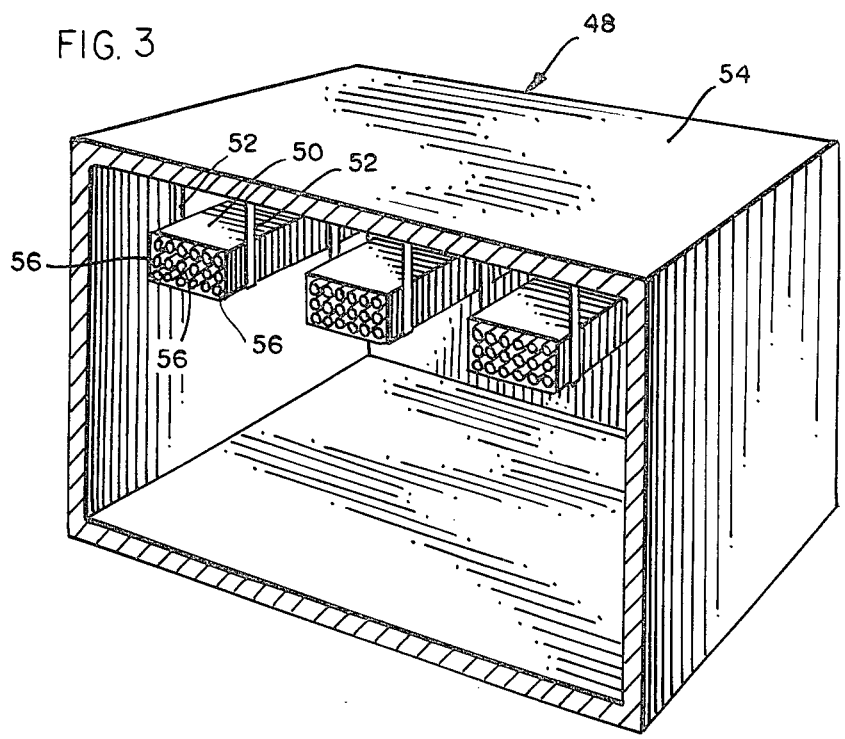
FIG. 3 is a perspective view of one typical environmental setting in the form of an electrical cable tray room associated with a nuclear reactor wherein the system and apparatus of FIG. 1 may be effectively employed.

Referring to the drawings and more particularly to FIG. 1, the reference numeral 10 designates an exemplary embodiment of a system and apparatus for monitoring and determining temperatures of interest within an environment in accordance with the present invention. The system 10 preferably includes a plurality of elongated thermoelectric transducers 12 disposed and arranged within the environment to be monitored. The transducers 12 (as shown more particularly in FIG. 2) may be constructed so as to include a pair of thermocouple conductors 14, a mass of semiconductive material 16, which surrounds the thermocouple conductors 14, and an outer sheath or enclosure 18.

Because of the unique versatility and capabilities of the present invention, any number of typical applications might be disclosed wherein one or more of the transducers 12 are selectively arranged or deployed. In addition, particular applications for utilization of the present invention may dictate a transducer configuration other than as illustrated in FIGS. 2 and 4 through 6. Thus, it should be understood that the present invention contemplates various alternatives to the particular transducer structure 12, the major consideration being that such a transducer may comprise a simplistic "J", "K", "T" thermocouple wherein two dissimilar conductors are employed to generate a thermal EMF or may, for example, comprise a single current carrying conductor enclosed within a sheath or two similar conductors to provide a path for signal return.

In the system 10 as illustrated, the transducers 12 respond to environmental conditions which prevail in the monitored region so that thermoelectric signals will be generated by said transducers 12 (or selected portions thereof) when such monitored conditions deviate from pre-established normal or ambient conditions.

A scanning means 20 is operatively associated with one or more of the transducers 12 for selectively sensing the thermoelectric signals generated as a result of junctions formed between the conductors 14 and across the semiconductive material 16 at points, for example, of elevated temperature. The scanning means 20 is capable of identifying any one of the scanned transducers 12 as may be required by the criteria established for use of the present invention in particular applications. The apparatus 10 also includes converting means 22 for translating the signals produced by the transducers 12 into suitable sense perception signals.

A control means 24 is coupled to the scanning means 20 for controlling the selective scanning of one or more of the transducers 12 and for dictating the frequency and duration of such transducer scanning. In accordance with the invention, the sense perception signals generated by the transducers 12 through the converting means 22 are then presented by either an alpha/numeric display component 26 or an alarm element 27 capable of producing visual and/or audio signals which forms a part of the converting means 22. The display function may also be advantageously effected by a graphic terminal system 28 giving a graphic display of precise locations of temperatures of interest.

Referring more specifically to FIGS. 1 and 2, the conductors 14 of each of the transducers 12 have first ends 30 operatively associated with a multiplexer 32, and the scanning means 20 is preferably a microprocessor that is operatively associated with the multiplexer 32. The apparatus 10 may further include control means 24 in the form of a keyboard that is linked or coupled to the microprocessor 20. Through the use of the keyboard (or other switch control console) a number of versatile control or scanning functions may be realized. For example, one or more of the transducers 12 may be identified for continuous scanning and the frequency and duration of scanning of all or a selected number of transducers may be initially preset and/or altered as circumstances or conditions within the monitored environment dictate. The converting means 22 is preferably comprised of an analogue/digital converter element 34 coupled to the output of the multiplexer 32. The output of the converter 34 is in turn supplied to an alpha/numeric display element 26, an alarm element 27, and a suitable selectively operable recording means 36 (for example, in the form of a paper printer linked to the alpha/numeric display element 26). The graphic terminal system 28 is also coupled to the output of the multiplexer 32 through a time domain reflectometer 35 so as to effectively provide not only a graphic display of temperature locations but also a graphic profile of temperature conditions prevailing along one or more of the transducers 12, as hereinafter more fully described.

In a preferred form of the invention, the converting means 22 (comprised of the analogue/digital converter 34, the alpha/numeric display component 26 and the paper printer 36) constitutes a unitary and commercially available data logger. Preferably, a unit such as a Monitor Labs, Model 9300 is employed. Such a unit also permits selection of the output means for the alarms including visual, audio, or both and alarm conditions are recorded during periodic summary outputs. This type of converting means has the further advantage of alarm parameters being flagged on the display, alarm output means, and printer.

Additional features of the converting means 22 of the referenced type includes an EAROM (electrically alterable read only memory) option which stores operator entered instructions in a non-volatile memory. The system also will automatically and indefinitely preserve a program during a power outage and allows for expansion to over 1000 channels to respond to a variety of thermocouple types or other transducer configurations.

With the converting means 22 of the present invention, the microprocessor 20 may be used to continuously monitor one or more of the transducers 12 in any combination with a preselected frequency and duration of transducer scanning. The microprocessor 22 takes the signals generated at points along the transducers 12, identifies the transducers 12 generating signals of interest, may signal the converting means 22 to translate the signals of the identified transducer(s) 12 into a numeric display indicative of the magnitude of a temperature of interest, and may also signal the converting means 22 to make periodic or continuous permanent records by means of the paper printer 36. However, the microprocessor 20 momentarily stops scanning upon sensing signals deviating more than a preselected minimum from a preestablished norm at which point alarm indicators, either visual or audio or both, are activated. Those skilled in the art will appreciate that the transducer signals may simultaneously be processed as described and also utilized to effect remote control or signalling functions.

Upon reaching alarm conditions, the graphic terminal system 28 and the time domain reflectometer 35 are also activated by the microprocessor 20. Preferably, the graphic terminal system 28 is of a type similar to the 4051 Graphic System of Tektronix. Such a device has built-in computational power plus graphic capabilities. It is possible with a graphic terminal system to pinpoint the location of temperatures of interest in a temperature monitoring system with precision. Such a device translates signals from the time domain reflectometer 35 into the graphic distance display 37.

As mentioned, the graphic terminal system 28 utilizes signals from the time domain reflectometer 35. Preferably, a unit such as a Tektronix, Model 1503, is employed as the time domain reflectometer, although it is conceivable that other or equivalent types of equipment accomplishing a similarly useful signal generating function may be employed. The Tektronix device functions by sending pulses of energy down the transducers with each separate cable fault returning a reflection. It is the shape of the display on the time domain reflectometer which indicates the approximate distance to the fault. Such a device also produces a signal which may be utilized by graphic terminal systems capable of pinpointing the location of each separate cable fault with precision. With such a device, it is possible to literally produce a profile illustrating and locating various temperature conditions of interest along the transducers.

With the above, it will be appreciated that time domain reflectometers function in a manner similar to a radar network. A pulse is sent down a transducer to the point where the pulse encounters a fault. From that point, an echo of the pulse returns to the device 35 and to the graphic terminal system 28. A measurement of the time of the transmission and reception periods is used to calculate the distance to the fault. On the screen to the graphic terminal system 28, a graphic display of the distance to the fault is given.

At points of temperature deviations from a norm, the scope 38 of the time domain reflectometer 35 will show downward echos, e.g., 40a and 40b, spaced along the length of the temperature profile curve 42. The distance of the reflected echos 40a and 40b from the origin 44 may also be read directly from the temperature profile curve 42 by suitable calibration. The temperature profile curve 42 may also be permanently recorded on a paper printer 46 integrally associated with the time domain reflectometer 35. With these features of construction, an alarm condition within an environment may readily be investigated by pinpointing a transducer 12, and the magnitude and location of a temperature of interest is discerned by the converting means 22, the graphic terminal system 28, and the time domain reflectometer 35.

Referring to FIG. 2, the apparatus and system 10 may be tested and calibrated in a simple, but effective manner. This may be done by including an element 47 which may either be a resistor or a thermistor integrally associated with one end of the conductors 14 of each of the transducers 12 remote from the multiiplexer 32. A current is then applied to the conductors 14 of the transducers 12 which include the resistor or thermistor 47. This will generate signals at the points along the transducers 12 corresponding to the ends of the conductors 14 remote from the multiplexer 32. A known current and the known characteristics of the resistor or thermistor 47 and the other components of the transducer 12 permit testing by comparing the temperature at points along the transducers 12 corresponding to the ends of the conductors 14 remote from the multiplexer 32 with the actual readings of the magnitude of temperature given by the alpha/numeric display element 26. This also permits calibration of the graphic terminal system 28 and time domain reflectometer 35. Because the lengths of the transducers are known, the signals being generated at any point along the transducers 12 will be noted relative to the "end" calibration signals, and the readings on the graphic terminal system 28 and the time domain reflectometer 35 can be calibrated against the known lengths. All that is required in terms of impedance characteristics is that the impedance of an open circuit be greater than the impedance of the resistor or thermistor 47.

As an exemplary application of the present invention, electrical cable tray room 48 is illustrated in FIG. 3 which typically includes a plurality of cable trays 50 supported by vertical hangers 52 from the ceiling 54. A plurality of electrical cables 56 are carried within each of the cable trays 50 in what is commonly referred to as a cable bundle made up of individual electrical cables 56 used to carry electrical power from a source or instrument signal information from the reactor system to the control room or vice versa. Due to the critical nature or function of the cable tray rooms 48 to the operation and control of the nuclear reactor, it is imperative to continuously monitor conditions within the room so that fires or abnormal temperature rise may be discovered in their incipiency in order to avoid a major nuclear accident; in fact, recent Nuclear Regulatory Commission regulations make such monitoring mandatory.

Of course, smoke or ion detectors of various types are commonly available for monitoring. The problem with this type of monitoring is that there is no warning of a potentially dangerous condition until smoke exists which may mean that a fire is rapidly developing. Conversely, the detectors cannot discriminate between smoke from a fire in the room and temporary smoke induced by a non-harmful source. These detectors also must be placed at a plurality of locations within an electrical cable tray room in order to be effective and even then it is impossible to quickly and precisely locate the source of trouble since the detectors are not designed to accomplish this objective and their effectiveness is still further diminished by both naturally occurring and artificially produced air currents within the room. The problems with this type of monitoring render it far less than desirable especially considering the potentially catastrophic nature of a nuclear accident. Additionally, the cost is inordinately high relative to the level of protection provided inasmuch as a large number of smoke detectors must be used in order to achieve a minimum acceptable protection level, and a false alarm by a detector will cause "dumping" expensive extinguishing material such as Halon 1301 or carbon dioxide unnecessarily.

Figure 4:
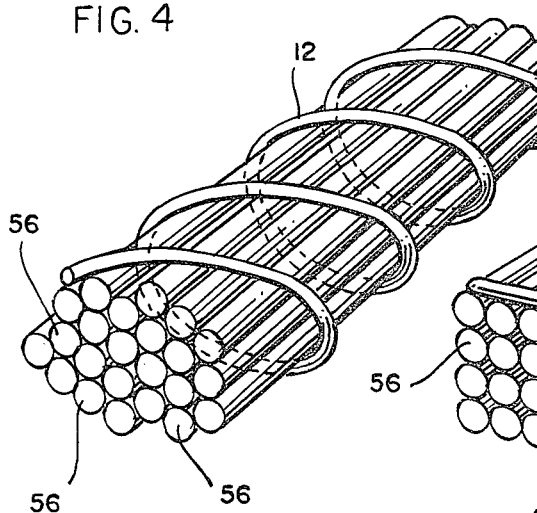
FIG. 4 is a perspective view of an electrical cable bundle or assembly illustrating one typical array or deployment of a transducer element for effecting a monitoring function in accordance with the present invention.
Figure 5:
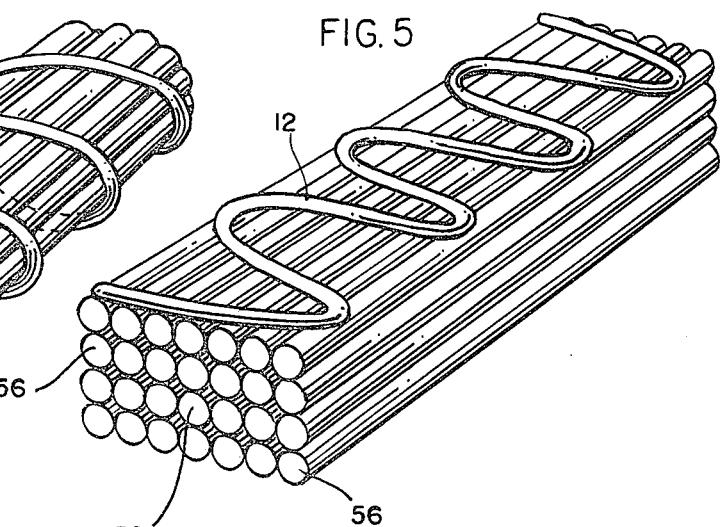
FIG. 5 is a perspective view of an alternative manner of deploying a transducer element for effecting such a monitoring function.
Figure 6:
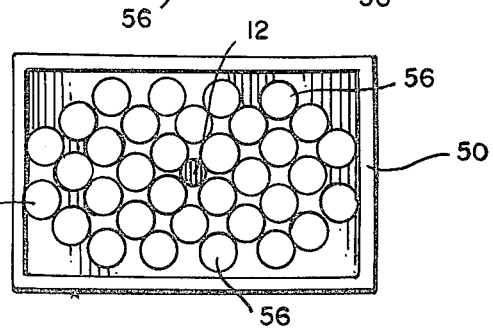
FIG. 6 is an end view of a cable bundle or assembly illustrating still another possible deployment of such a transducer element.

In contrast, the apparatus and system 10 of the present invention has the capability of providing complete protection for the electrical cable tray room 48 by continuously monitoring each of the cable trays 50 for points of elevated temperature. The transducers 12 which are passive, self-generating and false alarm proof may be wound about the cable bundle made up of the individual electrical cables 56 in helical coil fashion (as shown in FIG. 4), laid along the top of the cable bundle in zig-zag fashion (as shown in FIG. 5), extended through the middle of the cable bundle (as shown in FIG. 6) or may be used in any other manner with the cable bundle that may prove advantageous depending upon specifications, capacities, arrangement, etc., including placement on the outside of the cable trays 50 running longitudinally, transversely, or in both directions relative thereto in a grid type pattern or network. It will be appreciated, of course, that one of the transducers 12 is usually sufficient to monitor temperature conditions along each of the cable trays 50. The first end 30 of the conductors 14 of each of the transducers 12 are then connected to the multiplexer 32; the microprocessor 20 is activated and the keyboard 24 is used to select the transducers 12 to be monitored (as well as the frequency and duration of monitoring); and the alarm temperature levels are set. When this has been done, the apparatus 10 makes it possible to closely monitor every cable tray 50 in the electrical cable tray room 48 so as to detect both the magnitude and location of temperatures in excess of a preselected minimum well before smoke appears so that preventive action may be taken long before a potentially dangerous condition develops; in fact, with a grid type arrangement, the location can be determined even more precisely by determining the location along at least two transducers in X-Y coordinate fashion to establish a zone of high temperatures.

While the apparatus and system 10 have been illustrated as useful for determining temperature conditions within an electrical cable tray room 48, those skilled in the art will readily see a wide variety of advantageous applications. Among those perceived at the present time include monitoring the temperature in the core of a nuclear reactor; monitoring aircraft or marine engines, granaries, steam hot water or chemical carrying pipes; and/or monitoring various commercial and/or industrial processing systems and substantially any other environment requiring, demanding or advantageously utilizing precise temperature monitoring. Accordingly, those skilled in the art will appreciate that the apparatus 10 is not to be limited in any sense to the particular application discussed.

While the apparatus and system 10 have been discussed in some detail hereinabove, the individual components may be selectively altered or modified in construction and operation as technological advances dictate. It is forseeable, for instance, that while the keyboard 24, microprocessor 20, multiplexer 32, analogue/-digital converter 34, alpha/numeric display 26, paper printer 36, graphic terminal system 28, and time domain reflectometer 35 are presently electrically linked in the manner described, one or more of these components may be linked or operatively associated with the corresponding other ones of the components by microwave means, satellite control, radio frequency control, or otherwise. It is also foreseeable, for instance, that while the conductors 14 are presently formed from dissimilar thermoelectric materials such as chromel and alumel, the semiconductive material 16 is suitably manganese dioxide, and the outer metallic sheath 18 is stainless steel, other materials and/or transducer constructions exhibiting similar or generally equivalent characteristics may be substituted. However, the means for determining temperature conditions within an environment will remain unchanged.

Those skilled in the art will appreciate that the coupling of the transducers to the electronic components of the system (and the coupling of the components themselves) will be suitably effected to insure optimum signal transmission throughout the system.

In order to determine temperature conditions within an environment in accordance with one preferred embodiment of the present invention, a plurality of thermoelectric transducers 12 are disposed within the environment. The transducers 12 may each include a pair of conductors 14 formed of dissimilar thermoelectric materials and surrounded by a mass of semiconductive material 16. One or more of the transducers 12 are then scanned to sense thermoelectric signals generated as a result of junctions between the conductors 14 across the thermistor material 16 at points of elevated temperature. Those scanned transducers 12 generating thermoelectric signals of interest are thus identified. Finally, the thermoelectric signals of the identified transducers 12 are converted into appropriate sense perception signals indicative of a temperature of interest.

Additionally, one or more of the transducers 12 may be selected for scanning as may the frequency and duration of transducer scanning be selected. The scanning advantageously stops momentarily and the converting begins upon identifying those transducers 12 generating thermoelectric signals of interest (i.e., deviating more than a preselected amount from a pre-established norm). The temperatures of interest are then numerically displayed and can be recorded to maintain a permanent record.

Upon identification of one or more of the transducers 12 generating thermoelectric signals of interest, energy can be applied to the isolated transducer to obtain an energy profile corresponding to the junctions between the conductors 14. The energy profile is then converted into a temperature profile of the isolated transducers 12 indicative of the location of the temperature of interest. Moreover, sense perception signals can be provided by audio means, visual means, or both indicating the magnitude of the maximum temperature and also may be employed to effect remote control or signalling functions or appropriately linked to a computer.

With these features of construction, the present invention provides a novel method of and apparatus and systems for determining temperature conditions within an environment. The invention permits continuous monitoring of any or all of a large number of transducers disposed within an environment in any combination with a preselected frequency and duration of scanning. The monitoring or scanning may be controlled and preselected temperature limits may be established so that transducers generating thermoelectric signals of interest may be identified and the signals converted into sense perception signals indicative of the magnitude and location of temperatures of interest. It is further possible to obtain a temperature profile of the identified transducer and the temperature conditions within the environment may be permanently recorded.

While in the foregoing specification a detailed description of the invention has been set forth for purposes of illustration, the details herein given may be varied by those skilled in the art without departing from the spirit and scope of the invention.

We claim:

1. A method of determining temperature conditions within an environment through utilization of one or more transducers comprising:
   (a) selecting a scanning program form a plurality of scanning options to control transducer scanning;
   (b) scanning at least one transducer in accordance with said program to sense signals generated by said transducer;
   (c) monitoring said scanned transducer to identify a transducer generating a signal of interest deviating more than a preselected minimum from a pre-established norm; and
   (d) converting said signal of interest of said monitored transducer into a signal indicative of a temperature of interest.

2. The method in accordance with claim 1 wherein said converting step is initiated upon identification of said transducer generating said signal of interest deviating more than a preselected minimum from a pre-established norm.

3. The method in accordance with claim 1 including the step of displaying the magnitude of said temperature of interest upon identifying said transducer generating said signal of interest deviating more than a preselected minimum from a pre-established norm.

4. The method in accordance with claim 1 including the step of recording the magnitude of said temperature of interest upon identification of said transducer generating said signal of interest deviating more than a preselected minimum from a pre-established norm.

5. The method in accordance with claim 1 including the step of graphically displaying the location of said temperature of interest upon identifying said transducer generating said signal of interest deviating more than a preselected minimum from a pre-established norm.

6. The method in accordance with claim 1 including the step of recording the location of said temperature of interest upon identification of said transducer generating said signal of interest deviating more than a preselected minimum from a pre-established norm.

7. The method in accordance with claim 1 including the steps of:
   (a) applying energy to said monitored transducer to obtain an energy profile; and
   (b) converting said energy profile into a temperature profile of said monitored transducer indicative of the location of said temperature of interest.

8. The method in accordance with claim 1 wherein said signal indicative of said temperature of interest is provided by visual means indicating the magnitude of said temperature of interest.

9. The method in accordance with claim 1 wherein said signal indicative of said temperature of interest is provided by audio means indicating the magnitude of said temperature of interest.

10. The method of claim 1 wherein said signal indicative of said temperature of interest is a sense perception signal.

11. The method of claim 1 wherein said signal indicative of said temperature of interest is utilized to effect remote control or signalling functions.

12. The method of claim 1 wherein said monitoring of said scanned transducer continues uninterruptedly while said signal of interest is being converted into said signal indicative of said temperature of interest.

13. The method of claim 1 wherein said monitoring of said scanned transducer is interrupted upon identifying said transducer generating said signal of interest.

14. The method in accordance with claim 1 wherein said plurality of scanning options include the option to control the frequency and duration of transducer scanning.

15. The method in accordance with claim 1 wherein said transducers are transducer cables having a pair of conductors separated by a semiconductive material.

16. The method in accordance with claim 15 wherein each of said transducers includes a resistor integrally associated with adjacent ends of said pair of conductors for calibration thereof.

17. A method of determining temperature conditions within an environment through utilization of one or more transducers comprising:
   (a) selecting a scanning program from a plurality of scanning options to control transducer scanning;
   (b) scanning at least one transducer in accordance with said program to sense signals generated by said transducer when said temperature conditions within said environment deviate from a preselected standard;
   (c) monitoring said scanned transducer to identify a transducer generating a signal of interest indicating the condition of maximum temperature deviation; and
   (d) converting said signal of interest of said monitored transducer into a sense perception signal indicative of a temperature of interest.

18. An apparatus for determining temperature conditions within an environment through utilization of one or more transducers comprising:
   means for selecting a scanning program from a plurality of scanning options to control transducer scanning;
   scanning means operatively associated with at least one transducer in accordance with a selected scanning program for sensing signals generated by said transducer;
   means for identifying a transducer generating a signal of interest deviating more than a preselected minimum from a pre-established norm; and
   converting means for translating said signal of interest of said identified transducer into a signal indicative of a temperature of interest.

19. The apparatus in accordance with claim 18 wherein said converting means is initiated upon identification of said transducer generating said signal of interest deviating more than a preselected minimum from a pre-established norm.

20. The apparatus in accordance with claim 18 including visual means operatively associated with said converting means providing said signal indicative of said temperature of interest.

21. The apparatus in accordance with claim 20 wherein said visual means includes display means indicating the magnitude of said temperature of interest upon identification of said transducer generating said signal of interest deviating more than a preselected minimum from a pre-established norm.

22. The apparatus in accordance with claim 20 wherein said visual means includes recording means indicating the magnitude of said temperature of interest upon identification of said transducer generating said signal of interest deviating more than a preselected minimum from a pre-established norm.

23. The apparatus in accordance with claim 20 wherein said visual means includes temperature profile means indicating the location of said temperature of interest upon identification of said transducer generating said signal of interest deviating more than a preselected minimum from a pre-established norm.

24. The apparatus in accordance with claim 20 wherein said visual means includes graphic display means indicating the location of said temperature of interest upon identification of said transducer generating said signal of interest deviating more than a preselected minimum from a pre-established norm.

25. The apparatus of claim 18 wherein said signal indicative of said temperature of interest is a sense perception signal.

26. The apparatus in accordance with claim 25 wherein said sense perception signal includes a light element operatively associated with said converting means indicative of said temperature of interest upon identification of said transducer generating said signal of interest deviating more than a preselected minimum from a pre-established norm.

27. The apparatus in accordance with claim 25 wherein said sense perception signal includes a sound element operatively associated with said converting means indicative of said temperature of interest upon identification of said transducer generating said signal of interest deviating more than a preselected minimum from a pre-established norm.

28. The apparatus in accordance with claim 18 wherein said transducers are operatively associated with a multiplexer.

29. The apparatus in accordance with claim 28 wherein said converting means includes an analogue/digital converter element operatively associated with said multiplexer, and an alpha/numeric display element operatively associated with said analogue/digital converter element.

30. The apparatus in accordance with claim 29 including recording means operatively associated with said alpha/numeric display element for making a permanent record of said temperature of interest.

31. The apparatus in according with claim 30 wherein said recording means is a paper printer.

32. The apparatus in accordance with claim 28 including means for locating temperatures of interest operatively associated with said multiplexer.

33. The apparatus in accordance with claim 32 wherein said temperature locating means is a time domain reflectometer.

34. The apparatus in accordance with claim 32 wherein said temperature locating means is a graphic terminal system.

35. The apparatus of claim 18 wherein said signal indicative of said temperature of interest is utilized to effect remote control or signalling functions.

36. The apparatus of claim 18 including means for interrupting said scanning means upon identification of said transducer generating said signal of interest.

37. The apparatus in accordance with claim 18 wherein said program selecting means includes a keyboard for selecting one or more of said transducers for scanning.

38. The apparatus in accordance with claim 37 wherein said keyboard also permits selection of the frequency and duration of scanning of said selected transducers.

39. The apparatus in accordance with claim 18 wherein said transducers are transducer cables having a pair of conductors separated by a semiconductive material.

40. The apparatus in accordance with claim 39 wherein each of said transducers includes a resistor integrally associated with adjacent ends of said pair of conductors for calibration thereof.

41. A method of determining temperature conditions within an environment through utilization of one or more transducers comprising:
   (a) selecting a scanning program from a plurality of scanning options to control transducer scanning;
   (b) scanning at least one transducer in accordance with said program to sense signals generated at points along said transducer;
   (c) monitoring said scanned transducer to detect the generation of a signal of interest indicating a deviation in temperature at at least one of said points of more than a preselected minimum from a pre-established norm; and
   (d) converting said signal of interest of said monitored transducer into a signal to be utilized to effect remote control or signalling functions.

42. An apparatus for determining temperature conditions within an environment through utilization of one or more transducers comprising:
   means for selecting a scanning program from a plurality of scanning options to control transducer scanning;
   scanning means operatively associated with at least one transducer in accordance with a selected scanning program for sensing signals generated at points along said transducer;
   means for monitoring said scanned transducer to detect the generation of a signal of interest indicating a deviation in temperature at at least one of said points of more than a preselected minimum from a pre-established norm; and
   converting means for converting said signal of interest of said monitored transducer into a signal to be utilized to effect remote control or signalling functions.

* * * * *

UNITED STATES PATENT AND TRADEMARK OFFICE
CERTIFICATE OF CORRECTION

PATENT NO. : 4,324,138
DATED : April 13, 1982
INVENTOR(S) : Bayard C. Davis
Donald L. Heyden It is certified that error appears in the above—identified patent and that said Letters Patent is hereby corrected as shown below:

Column 1, line 55, after "Sept. 3," delete "1975" and insert --1957--.

Column 3, line 19, after "deviation" delete "of" and insert --or--.

Column 5, line 44, after "'K'," insert --or--.

Column 13, line 48, after "in" delete "according" and insert --accordance--.

Signed and Sealed this

Seventh Day of June 1983

[SEAL]

Attest:

DONALD J. QUIGG

Attesting Officer — Acting Commissioner of Patents and Trademarks